United States Patent
Strutz et al.

(10) Patent No.: US 6,306,522 B1
(45) Date of Patent: Oct. 23, 2001

(54) METAL LAMELLA STRIP, PROCESS FOR ITS PRODUCTION, AS WELL AS A FRAMEWORK BAND MADE FROM IT

(75) Inventors: Gerd Strutz, Schwelm; Norbert Seissler, Pocking, both of (DE)

(73) Assignee: Geissler Stanztechnik GmbH, Gauting (DE)

( * ) Notice: Subject to any disclaimer, the term of this patent is extended or adjusted under 35 U.S.C. 154(b) by 0 days.

(21) Appl. No.: 09/426,488

(22) Filed: Oct. 26, 1999

(51) Int. Cl.⁷ .................................. B32B 3/10; B32B 3/26
(52) U.S. Cl. .................... 428/595; 428/496; 428/600; 428/122; 72/378
(58) Field of Search .................................. 428/573, 575, 428/596, 595, 600, 122; 49/490.1; 72/378

(56) References Cited

U.S. PATENT DOCUMENTS 5,302,466  4/1994  Davis et al. .

FOREIGN PATENT DOCUMENTS

| 0 710 788 A1 | 11/1996 | (EP) . |
| 0 884 209 A1 | 6/1998 | (EP) . |
| 2 052 318 | 1/1981 | (GB) . |
| 60-215447 | 10/1985 | (JP) . |

*Primary Examiner*—Alexander S. Thomas
(74) *Attorney, Agent, or Firm*—Helfgott & Karas, P.C.

(57) ABSTRACT

A lamella strip intended for further processing into a framework band with a U-shaped or V-shaped cross-section comprises lamellae (2) defined by separating cuts (1) which stand opposite one another in pairs, which lamellae are connected with one another via bridges (4). Each lamella (2) is divided by a center cut (6). Each lamella has two oblong bead-like stamp marks (7), which are arranged on both sides of the center cut (6), and end at a distance (A) from the edges (3) of the lamella strip, forming a smooth end region (8). To produce such a lamella strip, first the separating cuts (1) and center cuts (6) are made in a strip of sheet metal, before the bead-like stamp marks (7) are formed.

10 Claims, 2 Drawing Sheets

Figure 1:
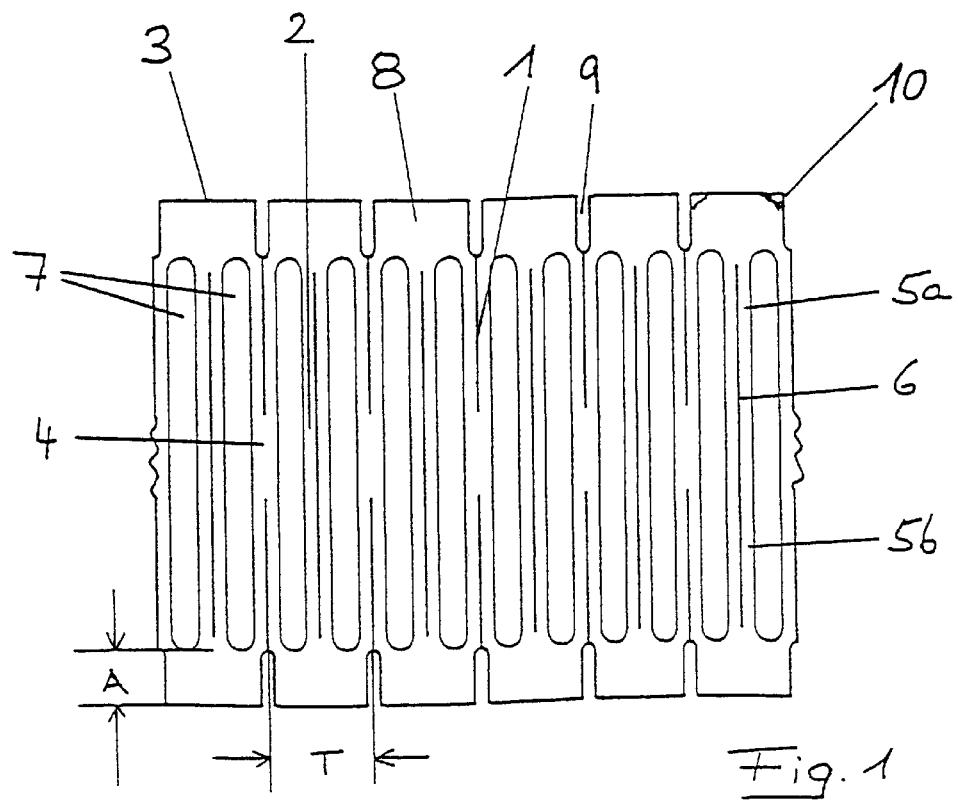

METAL LAMELLA STRIP, PROCESS FOR ITS PRODUCTION, AS WELL AS A FRAMEWORK BAND MADE FROM IT

The present invention relates to a metallic lamella strip as an intermediate product for further processing into a framework band with a U-shaped or V-shaped cross-section, which serves as a reinforcement insert for sealing profiles, edge protection profiles, or the like, with the following characteristics: Lamellae with two lamella shanks that stand opposite one another in pairs extend crosswise to the longitudinal axis of the lamella strip; each lamella shank is separated from the two adjacent lamella shanks by a separating cut; each lamella is connected with the two adjacent lamellae via a bridge, in each instance; a center cut extends crosswise to the longitudinal direction of the lamella strip, over one lamella in each instance, from one lamella shank over the center of the lamella strip into the opposite lamella shank. The present invention furthermore relates to a process for the production of such a lamella strip, as well as of a metallic framework band with a U-shaped or V-shaped cross-section, produced from the lamella strip stated initially, by means of profiling. The present invention finally relates to a process for the production of such a framework band from the lamella strip stated initially.

A lamella strip of the type stated initially, as well as a framework band produced from it, are known from the French patent application 2650648. In this case, the lamella strip is made of steel. After the separating cuts and the center cuts are made, the lamella strip is straightened by compression, at the edges as well as in the region of the center bridges, and hardened. In a third step, the lamella strip is stretched in its longitudinal direction, causing the separating cuts and the center cuts to open. Alternatively, a lamella strip made of aluminum is described, where in this case, instead of the separating cuts and the center cuts, corresponding cut-outs are punched into the aluminum strip, and the second step of compression is eliminated.

German Offenlegungsschrift 2717837 discloses a framework band with a U-shaped cross-section, which proceeded from a lamella strip, in which two adjacent lamellae were connected with one another, one below the other, via two bridges, in each instance. The lamellae have bead-like stamp marks, which extend from one end of the lamella in question to the opposite end, in each instance. The depth of the bead-like stamp marks decreases in the region of the lamella shanks to the edges of the lamella strip. This reference also explains the use of the framework band as a reinforcement insert, i.e. skeleton insert in a sealing profile or edge protection profile, so that detailed explanations in this regard are not necessary here.

Various other framework bands, i.e. lamella strips that serve to produce them, are known from German offenlegungsschrift 3708889, European patent 0416433, and German utility model 8607576. These references also deal with the use of the framework band as a reinforcement insert or skeleton insert in various sealing profiles and edge protection profiles.

In motor vehicles, sealing profiles that have metallic framework bands as reinforcement inserts are used, particularly in the region of door openings as well as the trunk opening. To install the sealing profile, either a sealing profile whose reinforcement insert has its final cross-sectional shape is clamped onto an edge of the car body; in this case a sealing profile with a metallic framework band with a U-shaped cross-section is generally used. Or a sealing profile whose reinforcement insert has a V-shaped cross-section is set onto the corresponding edge of the car body, and immediately afterwards, the framework band is deformed into an essentially U-shaped cross-section, using a suitable tool, in order to produce a firm connection with the car body. In both cases, it is important that a sufficient clamping force is provided by the reinforcement insert, in order to ensure a permanent bond between the sealing profile and the car body.

The conventional design of the framework band makes it possible, more or less well, for the corresponding sealing profile to follow the three-dimensional contour of the opening in each instance, even at relatively small gradients of curvature. It is obvious that the two requirements (great clamping strength, on the one hand, and good deformability, on the other hand) are in a competitive relationship with one another. In addition, car manufacturers have another wish: if possible, the sealing profile should also be compressible, in order to be able to equalize production and assembly tolerances and make it superfluous to cut the sealing profile or edge protection profile with a precision of a tenth of a millimeter.

Here again, with regard to compressibility, there is generally competition with the required clamping strength. Finally, there is also a competitive relationship between the clamping strength, on the one hand, and the weight of the corresponding profile, on the other hand. The latter can be quite significant. This is because in conventional passenger cars, many meters of the sealing profile, as stated, are used. This results in a significant weight for the conventional sealing profiles, since their framework band is generally made of sheet steel with a thickness of 0.5 mm, in order to ensure sufficient clamping strength.

The present invention is based on the task of creating a framework band of the type stated in the preamble of claim 6, as well as a lamella strip serving for its production, according to the preamble of claim 1, in which the ratio of the clamping strength to the weight is increased as compared to the state of the art which forms the basic type, without any disadvantageous effects on the deformability of the corresponding sealing profile or edge protection profile, and in addition, the corresponding sealing profile or edge protection profile is supposed to be compressible.

In accordance with the present invention, this task is accomplished, for a lamella strip of the type stated initially, in that each lamella has two bead-like oblong stamp marks, which are arranged on both sides of the center cuts, and extend from one lamella shank over the center of the lamella strip into the opposite lamella shank, where the bead-like stamp marks end at a distance from the edges of the lamella strip, in such a way that the lamella shanks have a non-stamped, smooth end region. The present invention therefore concentrates on the combination of a specific type of cut, on the one hand, and specifically shaped bead-like stamp marks, on the other hand, where this combination has a definite positive synergistic effect in view of the present statement of tasks. This is because the bead-like stamp marks arranged on both sides of the center cut of each lamella have the result that the center cuts and the separating cuts open slightly in those regions in which they and the stamp marks overlap. The slight opening of the separating cuts and the center cuts which results from making these stamp marks in the pre-cut sheet-metal strips is sufficient to guarantee a minimum of compressibility and deformability of the finished profile, without additional measures being required. Furthermore, the slight opening of the separating cuts and the center cuts results in sufficiently good adhesion between the framework band, on the one hand, and the material (elastomer or rubber) with which it is surrounded by injection molding, as part of the production of the sealing profile or edge protection profile, on the other hand, even without an adhesive or the like, if necessary. At the same time, the bead-like stamp marks result in a clear increase in the clamping strength, and at the same time, they can have a positive influence on the deformability of the lamella strip both around the up-and-down axis and the crosswise axis. Increasing the clamping strength permits a reduction in the material thickness and/or the selection of a lighter material (e.g. aluminum), so that a profile produced using the lamella strip according to the invention, i.e. the framework band according to the invention, is characterized by a significantly lower weight than known profiles, at the same clamping strength.

It is of decisive significance for the synergistic effect of the type of cuts, on the one hand, and the stamping, on the other hand, that the bead-like stamp marks do not extend to the edges of the lamella strip, but rather end at a distance from it, so that the lamella shanks have a non-stamped, smooth end region, in each instance. This prevents shortening of the lamella strip when the stamp marks are made, with the specific result that the separating cuts and the center cuts are slightly opened, as was explained.

Using the framework band according to the invention, it is possible to produce sealing profiles and edge protection profiles that demonstrate not only a high level of clamping strength at low weight, but also good deformability, and are compressible. In addition, the surface of the corresponding sealing profiles or edge protection profiles satisfies the high aesthetic demands of the motor vehicle manufacturers, because no excessive rippling of the surface takes place. In this connection, it is also important that the bead-like stamp marks end at a distance from the edges of the lamella strip. This characteristic furthermore has the effect that because of the smooth, sharp-edged structure of the related edges of the sealing profile or edge protection profile, it can be easily installed.

For the present invention, it is also significant that two adjacent lamellae are always connected with one another via a bridge, which is arranged more or less in the center, and from which the two opposite lamella shanks branch off on both sides. This is significant in the same manner for opening the separating cuts and the center cuts, as described further, when the bead-like stamp marks are produced in the metal strip, and for the deformability of the subsequent framework band. The width of the bridges, i.e. the distance between the opposite ends of the two separating cuts of a pair of them, is dimensioned in such a way, according to a preferred further development of the invention, that the bridge of a finished U-shaped profiled framework stand [sic—German "Gerüststand" should be "Gerüstband"=framework band] is restricted to part of the arc. In other words, in this further development of the invention, the separating cuts project into the arc of the framework stand [sic—see note above], which is U-shaped in cross-section, to a significant extent. In this sense, the width of the bridge can be limited to about 10–15% of the width of the lamella strip.

As a consequence of the increased ratio of the clamping strength to the weight of the sealing profile, the framework band according to the present invention can be made from a thinner sheet steel than is the case in the state of the art. For example, a sealing profile according to the invention, with a framework band made of a sheet steel with a thickness of 0.3 mm, has approximately the same clamping strength as a conventional sealing profile, with a framework band made of a sheet steel with a thickness of 0.5 mm. Likewise, by using the present invention, it is possible to make the framework band of sheet aluminum, instead of sheet steel, without losing any clamping strength. The possible weight savings are even more clear, in this case, than by reducing the thickness of the sheet steel.

In addition, the use of sheet aluminum for the production of a framework band which meets the practical requirements, which becomes possible by means of the invention, has two further decisive advantages. For one thing, no complicated sealing of the faces of the sealing profile or edge protection profile in each instance is required, as it was for the framework bands made of steel which have been used until now. This is because the framework band made of aluminum does not suffer any damage when it makes contact with moisture, in contrast to sheet steel. For another thing, the resilience of aluminum is clearly lower than that of steel. This has the result that when the sealing profile is installed by deforming the framework band from a V-shaped cross-section to a U-shaped cross-section (see above), a clearly greater clamping strength can be achieved than in the case of a conventional framework band made of steel.

A preferred further development of the present invention is characterized in that the expanse of the bead-like stamp marks crosswise to the longitudinal axis essentially corresponds to the expanse of the center cuts, or is slightly greater. In this case, this results in a particularly advantageous reciprocal influence between the center cuts and the bead-like stamp marks, in the sense of the synergistic effect explained above.

Another preferred further development of the invention is characterized in that cut-outs are provided in the region of the edge-side ends of the separating cuts. It is particularly practical, in this connection, if the depth of the cut-outs, measured in the direction of the separating cuts, essentially corresponds to the width of the non-stamped, smooth end regions of the lamellae. For the width of the cut-outs, a value between approximately 10% and 15% of the division of the lamella strip (distance from center cut to center cut) has proven to be particularly suitable. Such cut-outs have a positive effect, particularly in that contact of adjacent lamella shanks in the region of the edge of the lamella strip is reliably precluded. This in turn has the result that adjacent lamella shanks cannot prevent each other from assuming a stress-free position, in which the smooth end regions of all the lamella shanks lie in the same plane. Finally, this has the advantageous effect that a non-stretched lamella strip (see below) as an intermediate product can be rolled up, stored, and shipped for further processing.

If, on the other hand, one refrains from making cut-outs of the type described above in the region of the edge-side ends of the separating cuts, this offers the possibility of slightly stretching the lamella strip, so that adjacent lamella shanks do not hinder each other in the region of the edges. However, in this case it turns out that the storage and transport volume of the lamella strips rolled up into a coil is greater, due to the stretching.

The compressibility of a sealing profile or edge protection profile produced using a framework band according to the invention can be influenced by a greater or lesser degree of stretching of the lamella strip, i.e. the framework band, before it is surrounded by plastic or rubber in an injection-molding process. During such stretching, the separating cuts and the center cuts are opened in slit-like manner. This results in excellent compressibility of the sealing profile or edge protection profile produced using the corresponding framework band, with the simultaneous properties of low weight, good material utilization, good surface quality, and good adhesion of the plastic material or rubber of the sealing profile or edge protection profile to the framework band. Stretching between 5% and 20% will yield very good results in this regard, in most cases. In this connection, according to a further aspect of the invention, it is provided that the lamella strip, which is flat except for the stamp marks, is simultaneously stretched in its longitudinal direction during profiling to produce a framework band with a U-shaped or V-shaped cross-section, causing the separating cuts and the center cuts to open further. Such stretching of the lamella strip during its profiling can be achieved, in particularly simple manner, in that the diameters of the profiling rollers or profiling rolls increase slightly, from step to step, in the profiling tool, so that when the drive speed of rotation of all the profiling rolls and rollers remains the same, the finished profiled framework band leaves the profiling tool at a higher speed than the speed at which the lamella strip is fed into it. In this connection (stretching during profiling), in particular, the aspect explained above can be seen, according to which storage of non-stretched lamella strips is possible by making cut-outs in the region of the edge-side ends of the separating cuts.

Simply for clarification, it is pointed out that the separating cuts which separate two adjacent lamella shanks, in each instance, can be made both as incisions and as narrow cut-outs. The same holds true for the center cuts. In this regard, "opening" of these cuts during stretching of the lamella strip is also understood to mean widening of the separating cuts and/or center cuts that have been made as narrow cut-outs.

The orientation of the bead-like stamp marks is preferably such that they point inward on the framework band that is formed by bending of the lamella strip into a U-shape or a V-shape.

Figure 2:
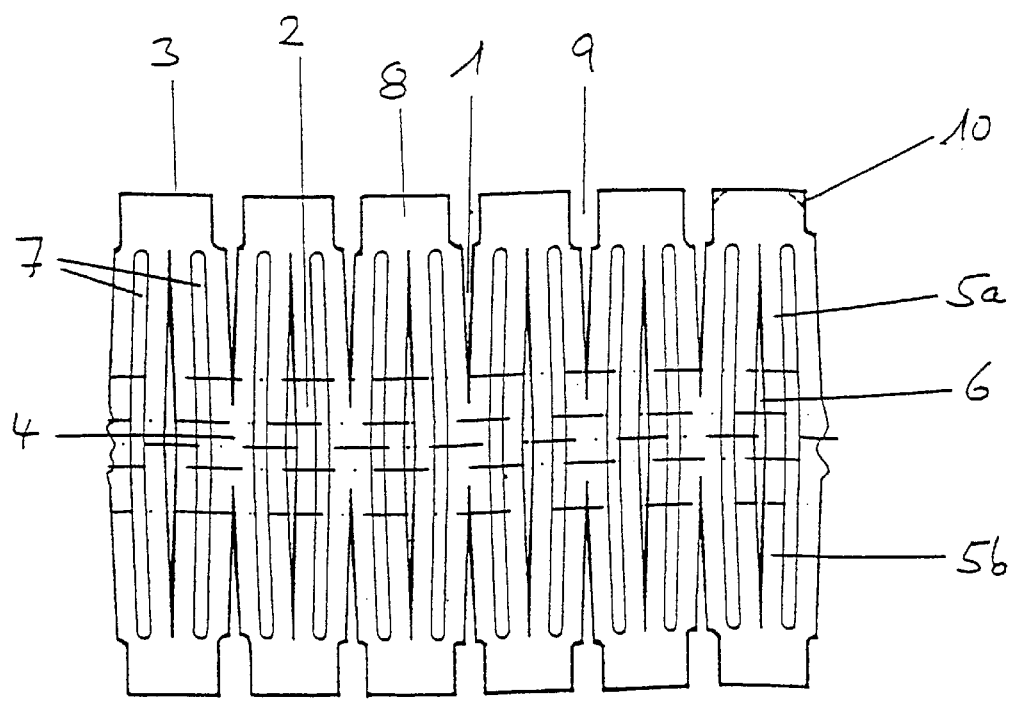
Figure 3:
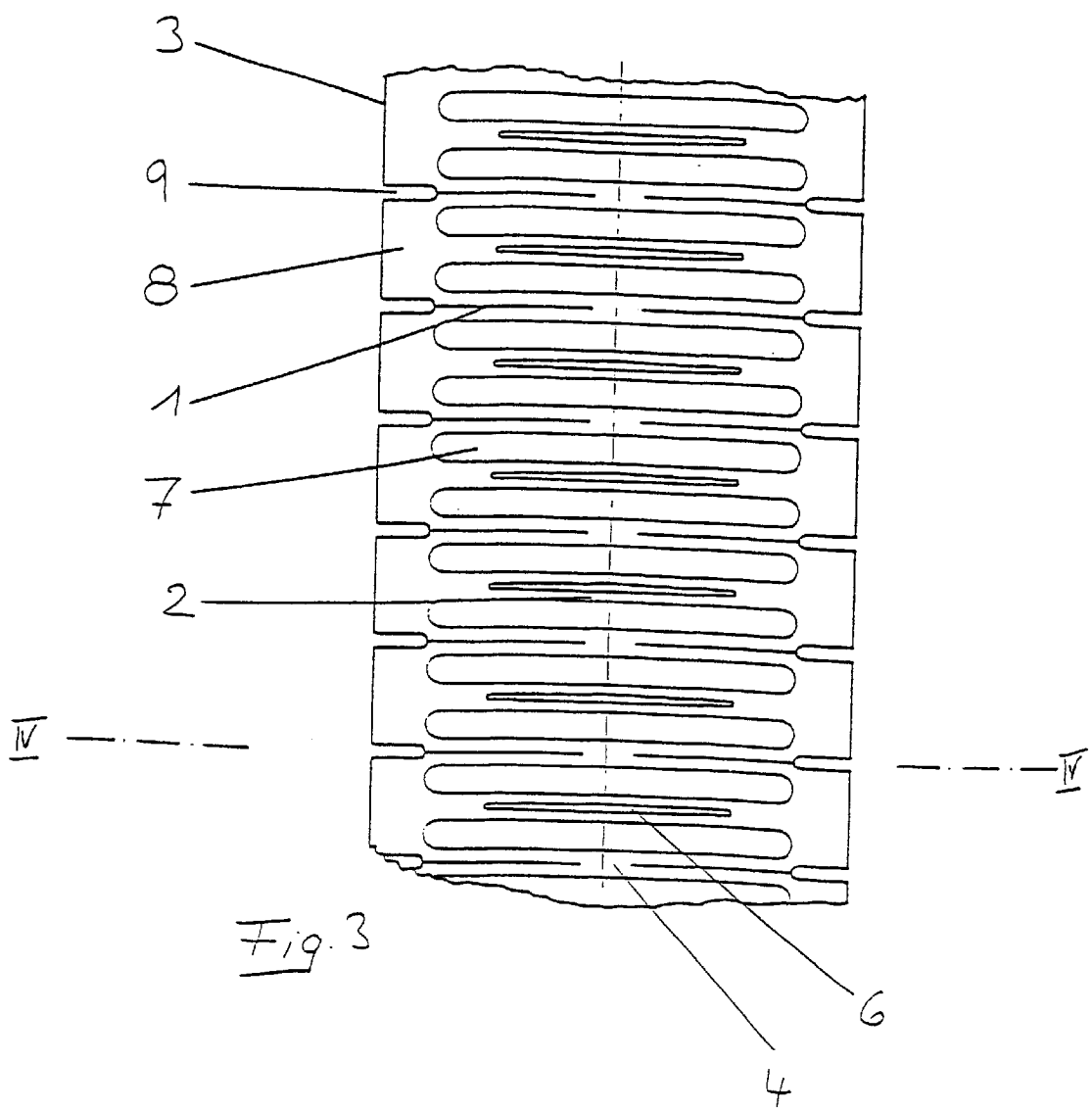
Figure 4:
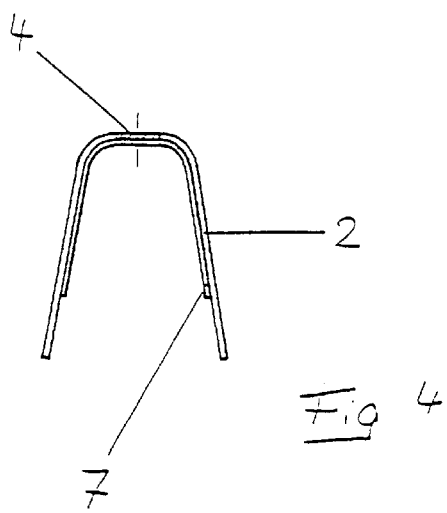

In the following, the invention will be explained in greater detail on the basis of two preferred exemplary embodiments shown in the drawing. This shows:

FIG. 1 a top view of the lamella strip according to a first embodiment, in the non-stretched state, FIG. 2 a top view of the lamella strip according to FIG. 1, in the stretched state (shown in exaggerated form), which at the same time represents a view of the profiled framework band, laid flat in the plane of the drawing, FIG. 3 a top view of a second preferred embodiment of the lamella strip according to the invention, in the non-stretched state, FIG. 4 a cross-section along the line IV—IV through a framework band which was produced by bending and stretching the lamella strip according to FIG. 3.

The lamella strip shown in FIG. 1 is comprised of a piece of sheet metal that is flat, aside from bead-like stamp marks (see below), in which lamellae 2 are formed by means of separating cuts 1, which lie opposite one another in pairs, and which are at a distance from one another that corresponds to the division T. The separating cuts 1 extend from the edge 3 into the sheet-metal strip, in each instance. They end at a distance from the opposite separating cut, forming a bridge 4 that connects two adjacent lamellae with one another, in each instance. The width of the bridge is about 15% of the width of the lamella strip, in this connection. Each lamella 2 comprises two opposite lamella shanks 5a and 5b.

In each lamella 2, a center cut 6 is made, which runs parallel to the separating cuts 1. This extends over about 60–70% of the width of the lamella strip, and ends at a distance to the edges 3 of the lamella strip, in each instance.

Furthermore, each lamella 2 has two bead-like stamp marks 7, which are arranged on both sides of the center cut 6 of the corresponding lamella 2. The bead-like stamp marks 7 extend parallel to the center cuts 6, over essentially the same length as or slightly longer than these. They therefore end at a distance A in front of the edges 3 of the lamella strip, so that each lamella shank 5a or 5b has a non-stamped, smooth end region. As a result of placement of the bead-like stamp marks 7 in the metal strip, which has previously been cut by separating cuts 1 and center cuts 6, the cuts stated open slightly, but for reasons of keeping the drawing simple, this has not been shown in FIG. 1.

In the region of the edge-side ends of separating cuts 1, U-shaped cut-outs 9 are provided. Their depth corresponds to the width A of the non-stamped, smooth end regions 8 of the lamella shanks. The width of the cut-outs corresponds to approximately 12% of the division T. Optionally, the cut-outs 9 make a transition into the corresponding edge 3 of the lamella strip via a rounded part 10.

The framework band produced by profiling and stretching the lamella strip shown in FIG. 1, in the longitudinal direction, is shown laid flat in the plane of the drawing in FIG. 2. During profiling of the flat lamella strip (FIG. 1) into a U-shaped, profiled framework band, the metal strip was subjected to stretching. This caused the separating cuts 1 and the center cuts 6 to open in slit form, as shown in FIG. 2.

The lamella strip shown in FIG. 3 differs from the one in Fig. 1 only in that the center cuts 6 are made not as incisions but rather as narrow cut-outs. Correspondingly, the separating cuts 1 could also be made as narrow cut-outs instead of as incisions.

FIG. 4 shows that in the pre-finished framework band, it is practical if the bead-like stamp marks 7 are directed inward, i.e. project to the inside beyond the area defined by the mellae.

What is claimed is:

1. Metallic lamella strip as an intermediate product for further processing into a framework band with a U-shaped or V-shaped cross-section, which band is capable of serving as a reinforcement insert for sealing profiles or edge protection profiles, said strip comprising:

lamellae with two lamella shanks that stand opposite one another in pairs and extend crosswise to the longitudinal axis of the lamella strip;

each lamella shank being separated from the two adjacent lamella shanks by a separating cut;

each lamella being connected with the two adjacent lamella via a bridge, in each instance;

a center cut extending crosswise to the longitudinal direction of the lamella strip, over one lamella in each instance, from one lamella shank over the center of the lamella strip into the opposite lamella shank;

wherein each lamella has two oblong beads, which are stamped on both sides of the center cut, and extend from one lamella shank over the center of the lamella strip into the opposite lamella shank; and wherein the beads end at a distance from the edges of the lamella strip, in such a way that the lamella shanks have a non-stamped, smooth end region, in each instance.

2. Metallic lamella strip according to claim 1, wherein the expanse of the beads essentially corresponds to the expanse of the center cuts, or is slightly greater.

3. Metallic lamella strip according to claim 1, wherein the cut-outs are provided in the region of the edge-side ends of the separating cuts.

4. Metallic lamella strip according to claim 3, wherein the depth of the cut-outs essentially corresponds to the width of the non-stamped, smooth end regions of the lamella shanks.

5. Metallic lamella strip according to claim 4, wherein the width of the cut-outs is between 10% and 15% of the division of the lamella strip.

6. Metallic lamella strip according to claim 3, wherein the cut-outs make a transition into the corresponding edge via a rounded part.

7. Process for the production of a lamella strip according to claim 1, where in a first step, the two separating cuts that lie opposite one another in pairs is made in a strip of sheet metal, and the center cuts which lie between two pairs of separating cuts, in each instance, are made, and subsequently, in a second step, two oblong beads are formed in each lamella defined by two adjacent pairs of separating cuts, which are arranged on both sides of the center cut, and extend from one lamella shank over the center of the lamella strip into the opposite lamella shank.

8. Process according to claim 7 for the production of a lamella strip according to claim 3, where the cut-outs are made in the metal strip before the beads are formed.

9. Process for the production of a framework band according to claim 7 from a lamella strip according to claim 1, where the lamella strip is simultaneously stretched in its longitudinal direction during profiling to produce the U-shaped or V-shaped cross-section, order to open up the separating cuts and the center cuts.

10. A metallic framework band with a U-shaped or V-shaped cross-section capable of serving as a reinforcement insert in sealing profiles and edge protection profiles, said band comprising:

lamellae with two lamella shanks that stand opposite one another in pairs and extend crosswise to the longitudinal axis of the lamella strip;

each lamella shank being separated from the two adjacent lamella shanks by a separating cut that has been opened in its longitudinal direction by stretching;

each lamella being connected with the two adjacent lamellae via a bridge, in each instance;

a center cut which has been opened in its longitudinal direction by stretching the framework band extends crosswise to the longitudinal direction of the lamella strip, over one lamella in each instance, from one lamella shank over the center of the lamella strip into the opposite lamella shank;

wherein each lamella has two oblong beads, which are stamped on both sides of the center cut, and extend from one lamella shank over the center of the lamella strip into the opposite lamella shank; and wherein the beads end at a distance from the edges of the lamella strip, in such a way that the lamella shanks have a non-stamped, smooth end region, in each instance.

* * * * *